INVENTOR
GEORGE ABRAHAM

BY Richard C. Reed

ATTORNEY

April 18, 1967 G. ABRAHAM 3,315,093

MULTISTABLE CIRCUIT HAVING ONE DIRECT AND ONE INVERTED NEGATIVE RESISTANCE

Filed Dec. 31, 1963 5 Sheets-Sheet 2

INVENTOR
GEORGE ABRAHAM

BY [signature]

ATTORNEY

INVENTOR
GEORGE ABRAHAM

BY [signature]

ATTORNEY

INVENTOR
GEORGE ABRAHAM

BY Richard C. Reed

ATTORNEY

April 18, 1967 G. ABRAHAM 3,315,093

MULTISTABLE CIRCUIT HAVING ONE DIRECT AND ONE INVERTED NEGATIVE RESISTANCE

Filed Dec. 31, 1963

5 Sheets-Sheet 5

INVENTOR
GEORGE ABRAHAM

BY Richard C Reed
ATTORNEY

United States Patent Office 3,315,093

Patented Apr. 18, 1967

3,315,093

MULTISTABLE CIRCUIT HAVING ONE DIRECT AND ONE INVERTED NEGATIVE RESISTANCE

George Abraham, 3107 Westover Drive SE., Washington, D.C. 20020

Filed Dec. 31, 1963, Ser. No. 334,947

5 Claims. (Cl. 307—88.5)

The invention described herein may be manufactured and used by or for the Government of the United States of America for governmental purposes without the payment of any royalties thereon or therefor.

The present invention relates to multistable switching circuits, and more particularly to multistable circuits utilizing inverted and combined negative resistance characteristics.

In the field of electronics for at least the last twenty years there has been an ever-present demand for small physical size, low weight, and increased reliable performance of electronic equipment. With the advent of the semiconductor these demands to a large extent were greatly satisfied. The use of electronic circuitry in such areas as digital computers, airborne and satellite equipment, and portable equipment of all types is still plagued by these very demands. An example of the difficulties encountered is to be found in switching circuits presently used in each of these areas in which a minimum of at least three stable states per stage is required. Here, present techniques require at least a single generator for each of two stable states of operation and a combining means or summing circuit to realize the composite tristable characteristic. Thus, with conventional techniques a radix 3 counter, for example, would require at least three active devices for each stage, namely, two generators and a combining means, resulting in a circuit relatively unreliable due to the number of components and connections, and a compromise in weight, size and complexity for the same reason.

Accordingly, it is an object of this invention to provide a multistable electrical component of minimal size and weight having at least three stable states.

Another object of the present invention is to provide a multistable circuit employing a minimum number of circuit elements, each of which are stable in three states.

It is another object of the present invention to provide a semiconductor device capable of producing a composite negative resistance characteristic having at least three stable states. To obtain this, the present invention contemplates the use of two p-n junctions of a multijunction semiconductor device to generate each of the negative resistance curves necessary, the utilization of the phase inversion properties of such devices to combine these negative resistance characteristics into a composite curve exhibiting at least three stable states. The present invention thus utilizes a single semiconductor device to provide the basic element of radix 3 switching circuitry, providing a saving in weight, size and reliability over prior art devices used in such circuits.

The multistable device of the present invention consists of a semiconductor device having at least two p-n junctions, preferably a transistor type structure, wherein each of the junctions are back biased and the device itself subjected to dynamic B+, such that both N- and S-type negative resistance curves are generated. The output taken between appropriate terminals results in an additive combination of the two dissimilar negative resistance characteristics, one of which has been converted in kind now like the other, producing either a double S-type or a double N-type negative resistance characteristic of three stable states. The phase inversion properties of the transistor structure have thus been utilized to convert one kind of the negative resistance characteristics to the other.

As used in the present application, dynamic B+ is defined as a large signal pump of continually varying potential having a frequency or a repetition rate greater than the reciprocal of the effective lifetime of the electrical charge carriers of the semiconductor device to which the source of dynamic B+ is applied. It is in effect an A.-C. power supply, which can for example, be a constant voltage square wave generator. This source of recurring signals is applied across a junction or junctions of a semiconductor device for the purpose of injecting and storing electrical charge carriers. Since the primary criterion of dynamic B+ is that the repetition rate of the signal be greater than the reciprocal of the effective lifetime of electrical charge carriers of the device to which it is applied, an abundance of injected carriers is built up to maintain a steady state of stored electrical charge carriers in the semicoductor device. As the amplitude of the dynamic B+ is increased, more injected carriers are stored in the bulk regions near the p-n junction, thus increasing internal regenerative feedback by lowering the internal impedance until negative resistance occurs. The concept of dynamic B+ is described in greater detail in applicant's U.S. Patent No. 2,964,654 for an Electrical Switching Circuit.

It must be understood that the pair of junctions subjected to dynamic B+ may be in a single semiconductor device or can be in separate devices externally connected in a circuit.

The negative resistance characteristic generated by the application of dynamic B+ to a semiconductor device is of the S-type, commonly designated as a short-circuit stable or voltage-stable negative resistance characteristic. This is to be distinguished from the N-type negative resistance characteristic exhibited for example by avalanche breakdown devices, better known in the art. The negative resistance characteristic which may be associated with avalanche breakdown is similarly designated open-circuit stable or current-stable. A negative resistance curve of the S-type is so called because the curve is in the shape of the letter S when voltage is plotted as ordinate and current as abscissa. This can readily be seen from the drawings which will be hereinafter described. An S-type curve is called short-circuit stable because of the fact that the curve can be swept out dynamically with a constant voltage source. A negative resistance curve that is voltage-stable is one in which a unique value of current is obtained for each value of voltage. This definition becomes manifest by the application of a series of low resistance load lines to the characteristic curve (i.e., subjecting the negative resistance device to a constant voltage source). Definitions of counterpart names of the N-type characteristic curve readily follows.

The nature of this invention as well as other objects and advantages thereof will be readily apparent from consideration of the accompanying drawings, in which.

Figure 1:
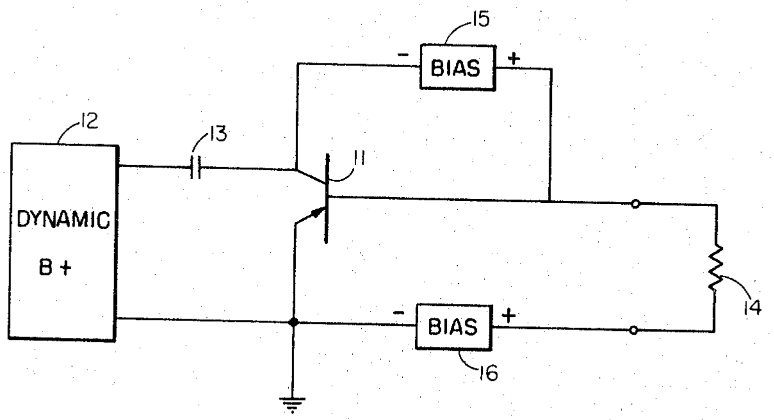
FIGURE 1 illustrates the preferred embodiment of the present invention.
Figure 2:
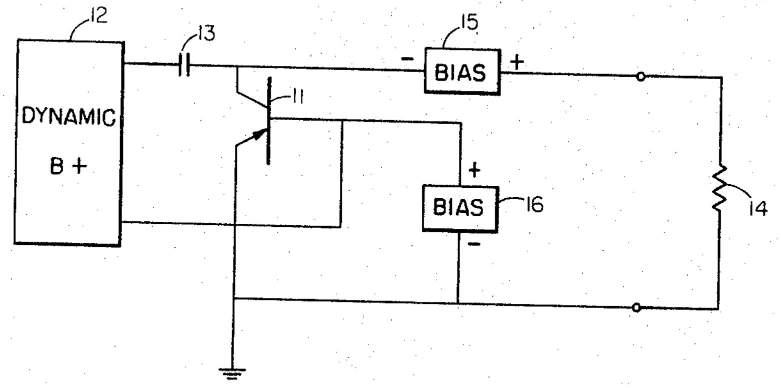
FIGURE 2 shows another and typical embodiment of the present invention.
Figure 6:
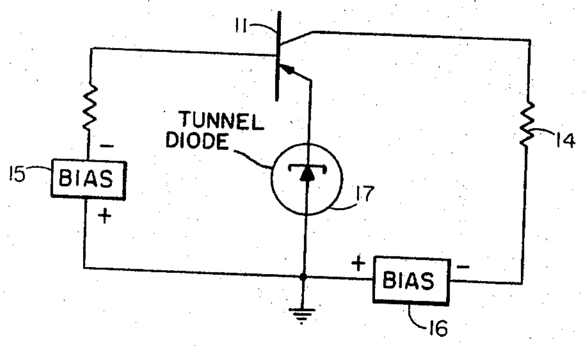

FIGURES 3A through D show the voltage current characteristics of the circuit in FIGURE 1;

FIGURES 4A–D and 5A–D show the voltage current characteristics of the circuit shown in FIGURE 2;

FIGURE 6 is an example of a tristable circuit utilizing a tunnel diode, and

Figure 7:
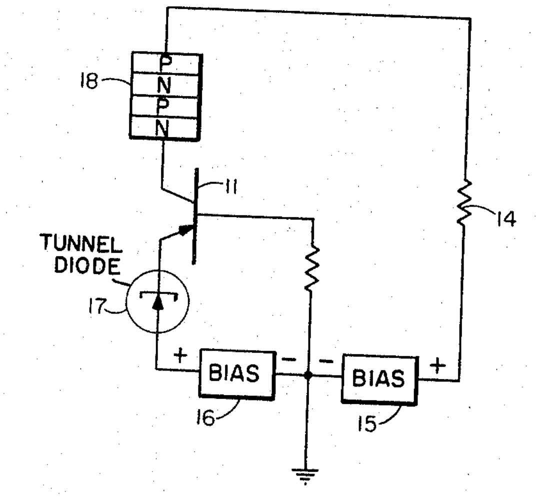

FIGURE 7 illustrates a tristable circuit utilizing a tunnel diode and a Shockley diode.

Referring to the drawings, wherein like reference characters refer to like parts throughout, there is illustrated in FIGURE 1 a source of dynamic B+ 12 applied across the collector emitter terminals of transistor 11. In this configuration push-pull injection is realized. Push-pull injection occurs when a source of dynamic B+ is applied across a pair of junctions connected back to back in a semiconductor device, so that the minority electrical charge carriers are injected into the regions bounding each junction during the portion of the cycle of operation in which the junction is forward-biased. With such twofold injection it is possible to generate an S-type negative resistance characteristic at both the collector-base and the emitter-base junctions. Capacitor 13, employed between the source of dynamic B+ 12 and the collector of transistor 11, serves as a means of connecting the source of dynamic B+ to this semiconductor device. Bias sources 15 and 16 serve to back-bias both the emitter-base and collector-base junctions, and although not shown are bypassed by capacitors. A load resistor 14, across which the output voltage of the circuit is realized, is connected across the emitter-base junction.

It should be understood that while FIGURE 1 shows one method of biasing the semiconductor junctions, other methods are available, and in some cases preferred. Instead of using D.-C. bias 16 with load 14, as shown, for example, the negative resistance phenomenon can be displayed dynamically by means of a sweeper and an oscilloscope. Another change readily available is the replacement of capacitor 13 with bias 15, connecting the negative terminal to the collector of transistor 11.

The circuit of FIGURE 2 is similar to the FIGURE 1 embodiment except that the source of dynamic B+ 12 is connected across the collector-base junction of transistor 11, and the output load resistor 14 is connected across the collector-emitter terminals.

Figure 3A:
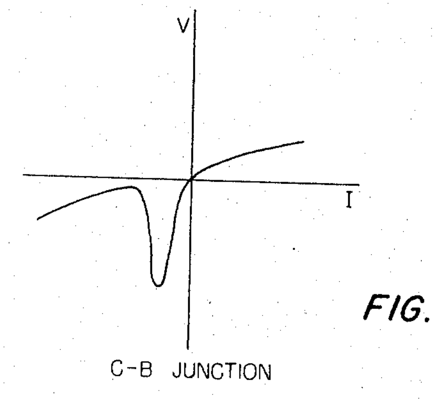
Figure 3B:
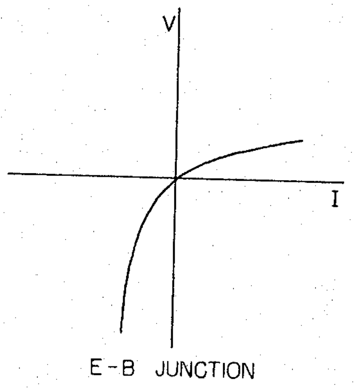

Referring to FIGURE 3 in conjunction with FIGURE 1, FIGURE 3A shows an N-type negative resistance characteristic generated at the collector-base junction, which is caused by increasing the bias 15, a reverse bias to this junction, until the avalanche breakdown threshold is reached. This showing is prior to the application of dynamic B+. At this time, FIGURE 3B shows a normal diode characteristic exhibited by the emitter-base junction.

Figure 3C:
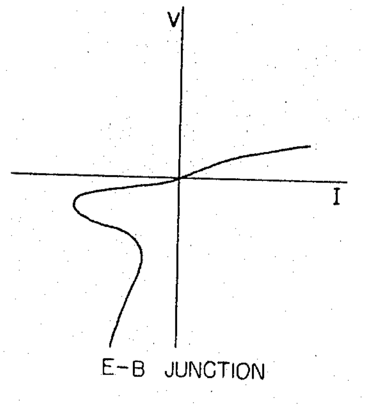
Figure 3D:
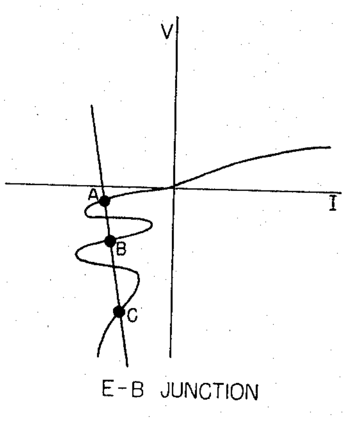

FIGURE 3C shows the emitter-base junction subjected to dynamic B+ and the resulting S-type negative resistance characteristic. The curve would be as shown, only in the absence of any other negative resistance phenomena, i.e., without the avalanche breakdown at the collector-base junction. What actually appears across the emitter-base junction, as seen across load resistor 14, is the double S-type negative resistance characteristic, as shown in FIGURE 3D. The curve here is the composite of the direct S-type curve generated at the emitter-base junction and the reflected N-type curve generated at the collector-base junction. The reflected N-type curve results from the phenomenon of phase inversion, common to three terminal devices. This phenomenon in its most familiar roll is witnessed as the 180° phase shift from grid to plate of a vacuum tube in normal signal amplification, or the equivalent base-to-collector inversion in the transistor. This inversion is readily dramatized in FIGURE 3A by interchanging the voltage and current axes and observing the shape of the curve as it appears in the third quadrant, while maintaining the voltage axis as the ordinate with the current axis as the abscissa. This affords 180° phase shift or complete signal inversion, and the N-type now appears as an S-type negative resistance characteristic. The N-type negative resistance associated with avalanche breakdown thus occurring at the collector-base junction is viewed as an S-type characteristic, looking into the emitter-base junction.

Figure 3E:
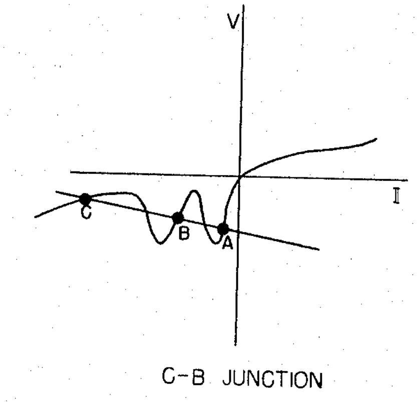
Figure 4A:
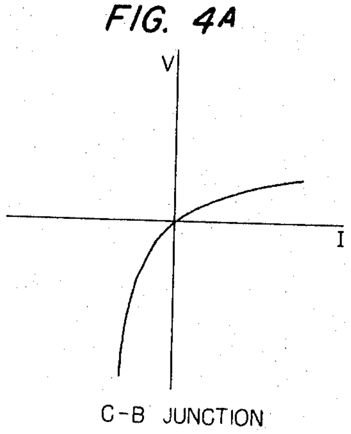
Figure 4B:
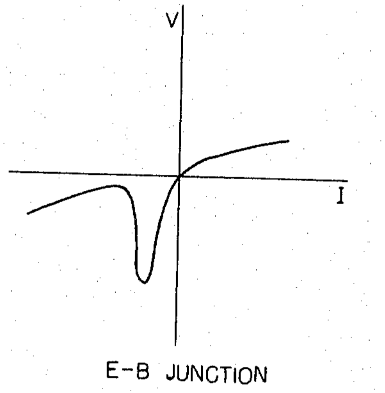
Figure 4C:
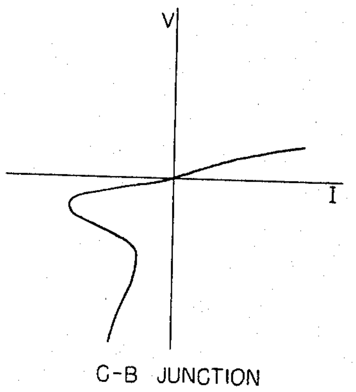
Figure 4D:
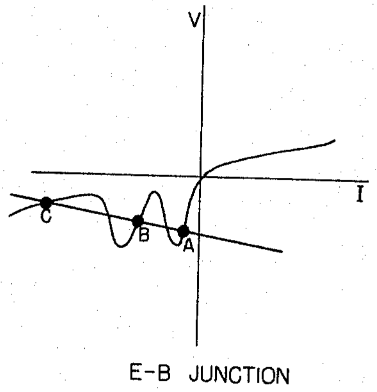

FIGURE 3E shows a double N-type curve at the collector-base junction, consisting of the N-type avalanche negative resistance characteristic generated there and the reflected S-type negative resistance characteristic which is generated at the emitter-base junction. In other words, the double S-type negative resistance characteristic seen at the emitter-base junction in FIGURE 3D, appears as a double N-type negative resistance characteristic when viewed from the collector-base junction. It should be understood that the normal transistor is not symmetrical and the curve shown is the ideal curve which would be realized from a symmetrical or double-collector type semiconductor device.

FIGURES 4 and 5 illustrate the same phenomenon realized from the embodiment of the multistable circuit shown in FIGURE 2. FIGURE 4 presumes that the load is not as shown in FIGURE 2 but is across the emitter-base junction, while FIGURE 5 is an illustration of the phenomenon as seen from the collector-emitter terminals, the actual case of FIGURE 2. FIGURE 4, thus is an illustration of the dexterity of this circuit. It shows that by raising the back-bias across the base-emitter terminals sufficiently, avalanche breakdown can be induced. This is shown in FIGURE 4B. Here, the negative resistance phenomenon is generated by injected minority carriers at the collector-base junction. This S-type curve is seen as a second N-type from the emitter-base junction as shown in FIGURE 4D.

Figure 5A:
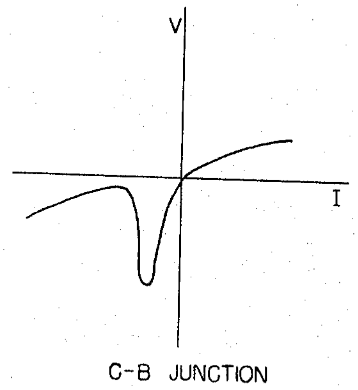
Figure 5B:
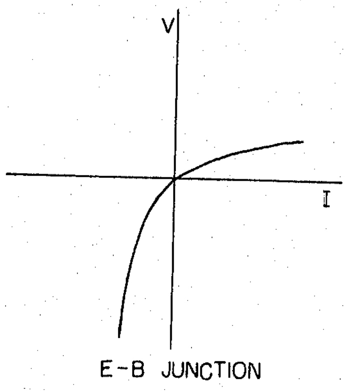
Figure 5C:
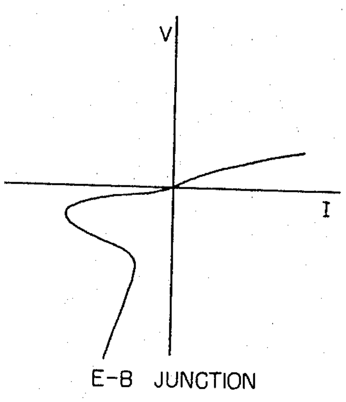
Figure 5D:
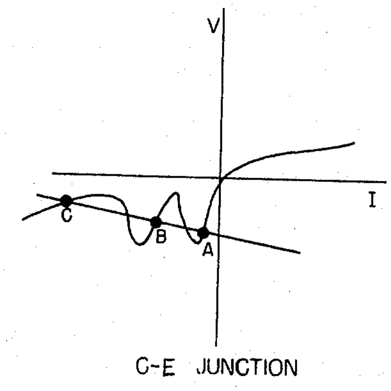

In FIGURE 5A it is the collector-base junction that is subjected to a reverse bias sufficient for avalanche breakdown and the emitter-base junction that suffers negative resistance generation of the injected carrier type. As seen from the collector-emitter terminals, the direct N and the converted S appear as a double N-type negative resistance characteristic.

The load lines in FIGURES 3D, 3E, 4D, and 5D serve to emphasize the advantage of the present invention over prior art three terminal negative resistance devices, namely, tristability. In each of these figures, letters A, B and C denote the intersection of the negative resistance curve with the load line at the positive resistance regions depicting the three stable states available. It is interesting to note that in FIGURE 3D, showing the double S-type negative resistance characteristic, that in switching from A to B to C, the first two states offer relatively low dynamic resistance, in the order of ohms to hundreds of ohms, while the final state C is a relatively high dynamic resistance state in the order of megohms, i.e., two "on" states followed by an "off" state. On the other hand, in FIGURES 4D and 5D, in switching from A to B to C, the first two states are in a relatively high resistance region, while the third is of relatively low resistance. It should also be understood that by the use of symmetrical semiconductor devices, one is able to realize from the same three terminal device either a double S-type negative resistance characteristic, as shown in FIGURE 3D, or a double N-type, as shown in FIGURE 3E.

Other factors pointing up the extreme flexibility of the circuit of this invention are to be found in the various degrees of control available. Control over the avalanche breakdown may be had by choice of device characteristic and by adjusting the D.-C. and dynamic biases across the junction not to be subjected to that reaction. Negative resistance generation due to minority carrier injection can be controlled by varying the amplitude, coupling, bias, or form factor of the dynamic B+. By varying the load the device can be made to perform in astable, monostable, bistable or tristable modes. With additional transistors, properly connected and biased, three additional stable states for each device added can be realized.

A further degree of freedom in the utility of the present invention is illustrated in FIGURES 6 and 7. FIGURE 6 shows that generation of the double S- or double N-type negative resistance characteristic is not dependent upon subjecting a semiconductor device to dynamic B+. The tunnel diode 17, connected in series with the emitter of transistor 11 is forward-biased to generate an S-type or short-circuit stable negative resistance characteristic. The collector-base junction of transistor 11 is back-biased via bias 16 until avalanche breakdown occurs. This result and the inverted S-type curve of the tunnel diode are combined as seen across load resistor 14 as a double N-type negative resistance characteristic. FIGURE 7 shows that other devices can be used for the generation of the negative resistance characteristic due to avalanche breakdown. Here illustrated is the Shockley four layer diode 18 employed to this end. Other devices that can be used for avalanche breakdown are the gas thyratron, the neon tube, or a controlled rectifier. Dynatron operation of a tetrode vacuum tube is another device which could be used for generating the S-type negative resistance characteristic.

Since various changes and modifications may be made in the practice of the invention herein described without departing from the spirit or scope thereof, it is intended that the foregoing description shall be taken primarily by way of illustration and not in limitation except as may be required by the appended claims.

What is claimed is:

1. A multistable circuit for generating a negative resistance characteristic having at least three stable stages, comprising:

first means for generating an S-type negative resistance characteristic;

second means for generating an N-type negative resistance characteristic;

biasing means coupled to said first and second means for biasing said first and second means and cooperating with said first and second means to convert said S-type negative resistance characteristic to an N-type negative resistance characteristic and means to combine said N-type and said converted S-type negative resistance characteristics as a composite double N-type negative resistance characteristic.

2. A multistable circuit, as recited in claim 1, wherein said first means for generating an S-type negative resistance characteristic is a tunnel diode.

3. A multistable circuit, as recited in claim 1, wherein said first means for generating an S-type negative resistance characteristic in a p-n junction subjected to a high frequency source.

4. A multistable circuit, as recited in claim 1, wherein said means for generating an N-type negative resistance characteristic is a back-biased p-n junction of a transistor.

5. A multistable circuit as recited in claim 1 wherein said first means generates an N-type negative resistance characteristic, said second means generates an S-type negative resistance characteristic, said biasing means converts said N-type negative resistance characteristic to an S-type negative resistance characteristic, and said means to combine acts to combine said S-type and said converted N-type negative resistance characteristics as a composite double S-type negative resistance characteristic.

References Cited by the Examiner

UNITED STATES PATENTS

| | | | |
|---|---|---|---|
| 2,939,966 | 6/1960 | Abraham | 307—88.5 |
| 3,053,998 | 9/1962 | Chynoweth et al. | 307—88.5 |
| 3,075,092 | 1/1963 | Dill | 307—88.5 |
| 3,089,967 | 5/1963 | Strull | 307—88.5 |

OTHER REFERENCES

National Electronics Conf., vol. XVI: State Characteristics of Combination of Negative Resistance Devices, by Richard A. Johnson et al., December 1960, pp. 427–437, Fig. 5 relied on.

ARTHUR GAUSS, *Primary Examiner.*

B. P. DAVIS, *Assistant Examiner.*